United States Patent
Storgato et al.

(10) Patent No.: US 7,794,005 B2
(45) Date of Patent: Sep. 14, 2010

(54) MOTOR VEHICLE SEAT ASSEMBLY EQUIPPED WITH A LOAD FLOOR FOR A TRUNK

(75) Inventors: Angelo Storgato, Orbassano (IT); Giorgio Masoero, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 157 days.

(21) Appl. No.: 12/314,942

(22) Filed: Dec. 19, 2008

(65) Prior Publication Data

US 2009/0167045 A1 Jul. 2, 2009

(30) Foreign Application Priority Data

Dec. 31, 2007 (EP) .................................. 07425841

(51) Int. Cl.
*B60N 2/02* (2006.01)
(52) U.S. Cl. .................... 296/65.01; 296/37.16
(58) Field of Classification Search .............. 296/65.01, 296/65.09, 69, 24.43, 66, 37.16; 297/316; 248/429
See application file for complete search history.

(56) References Cited

U.S. PATENT DOCUMENTS

| | | | | | |
|---|---|---|---|---|---|
| 2,886,093 | A | * | 5/1959 | Grady | 248/240.4 |
| 3,393,936 | A | * | 7/1968 | Hall | 296/24.44 |
| 4,728,141 | A | * | 3/1988 | Motozawa et al. | 296/37.16 |
| 5,011,208 | A | * | 4/1991 | Lewallen | 296/37.16 |
| 6,099,222 | A | * | 8/2000 | Moore | 296/37.16 |
| 6,174,021 | B1 | * | 1/2001 | le Claire et al. | 296/180.5 |
| 6,439,633 | B2 | * | 8/2002 | Nemoto | 296/37.14 |
| 6,516,983 | B2 | * | 2/2003 | Sotiroff et al. | 224/281 |
| 7,240,944 | B2 | * | 7/2007 | Plettrichs et al. | 296/37.16 |
| 7,673,921 | B2 | * | 3/2010 | Hirayama et al. | 296/37.16 |
| 7,699,398 | B2 | * | 4/2010 | Sokolla et al. | 296/65.17 |
| 7,708,327 | B2 | * | 5/2010 | Lim et al. | 296/37.1 |
| 2009/0074547 | A1 | * | 3/2009 | Klotz et al. | 414/392 |
| 2009/0195040 | A1 | * | 8/2009 | Birkbeck | 297/317 |

FOREIGN PATENT DOCUMENTS

| | | |
|---|---|---|
| DE | 10316887 | 7/2004 |
| DE | 202005009428 | 9/2005 |
| DE | 202006007784 | 8/2006 |
| EP | 1762435 | 3/2007 |
| FR | 2857922 | 1/2005 |

OTHER PUBLICATIONS

European Search Report mailed Jul. 2, 2008 in European Application No. 07425841.9.

* cited by examiner

*Primary Examiner*—Kiran B. Patel
(74) *Attorney, Agent, or Firm*—Davidson Berquist Jackson & Gowdey LLP

(57) ABSTRACT

A motor vehicle seat assembly has a longitudinally movable rear seat and a load floor, which is height-adjustable, can be placed in a boot and has a front portion coupled to a lever member in a rotational manner about a horizontal axis; the lever member can swing about a further horizontal axis, which is fixed with respect to the rear seat during the longitudinal movement of the rear seat; the load floor has a substantially flat rear panel, which is coupled in a sliding manner to the front portion so as to vary the length of the load floor depending on the longitudinal position of the rear seat.

18 Claims, 5 Drawing Sheets

MOTOR VEHICLE SEAT ASSEMBLY EQUIPPED WITH A LOAD FLOOR FOR A TRUNK

The present invention concerns a motor vehicle seat assembly equipped with a load floor for a trunk.

BACKGROUND ART

The provision of a load floor, which is height-adjustable inside a trunk between a raised position and a lowered position, is known of from European patent applications EP1762435 and EP1511654. The load floor is connected to the boot floor or the side walls of the body by levers, hinged at one end to turn about a fixed horizontal axis. At the opposite end, the levers are hinged to the front edge of the load floor about a horizontal axis, which is movable during the upward and downward movement of the load floor.

When in the raised position, the load floor rests on the supporting structure of the boot, defining a trapdoor for a hidden under floor area, and can be manually rotated about said movable horizontal axis to open the under floor area and stow luggage or other objects beneath the load floor.

There is awareness of the need to improve the above-described known solutions, in order to be able to also install the load floor on motor vehicles in which the position of the rear seat that defines the front of the trunk and is adjustable in the longitudinal direction of travel of the motor vehicle.

SUMMARY OF THE INVENTION

The object of the present invention is that of making a motor vehicle seat assembly equipped with a load floor for a rear trunk, which allows the above-described need to be met in a simple and economic manner.

Disclosed herein is a motor vehicle seat assembly that comprises: a rear seat, or more desirably a split rear seat with each portion or the seat as a whole being connected to a load floor that is height-adjustable and that can be placed in a trunk. The seat assembly includes at least one lever member designed to swing about a first horizontal axis and is coupled to a front portion of the load floor in a rotational manner about a second horizontal axis. The first and second horizontal axes are spaced or set apart and remain parallel to each other, and are orthogonal to a longitudinal axis of the motor vehicle. The rear seat is longitudinally movable to vary, for example, the size of the trunk. The first horizontal axis is fixed with respect to the rear seat during the longitudinal movement of the rear seat and the load floor comprises a substantially flat rear panel coupled in a longitudinally sliding manner to the front portion to vary the length of the load floor depending on the longitudinal position of the rear seat.

BRIEF DESCRIPTION OF THE DRAWINGS

For a better understanding of the present invention, a preferred embodiment shall now be described, purely by way of a non-limitative example and with reference to the enclosed drawings, where.

DETAILED DESCRIPTION OF THE INVENTION

Figure 1:
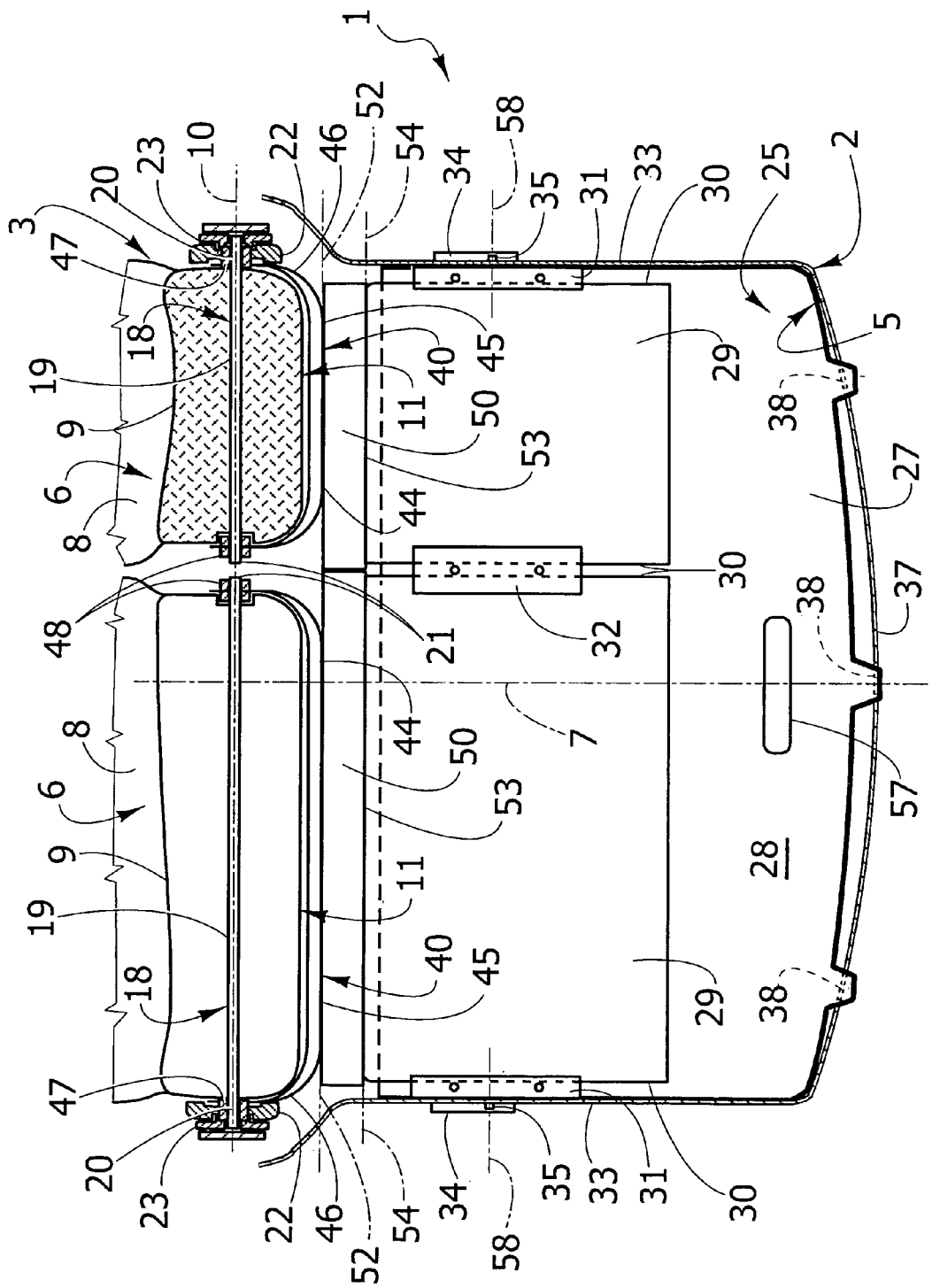
FIG. 1 is a plan view, with parts in section, of a preferred embodiment of the motor vehicle seat assembly equipped with a load floor for a rear trunk, made according to the present invention.
Figure 2:
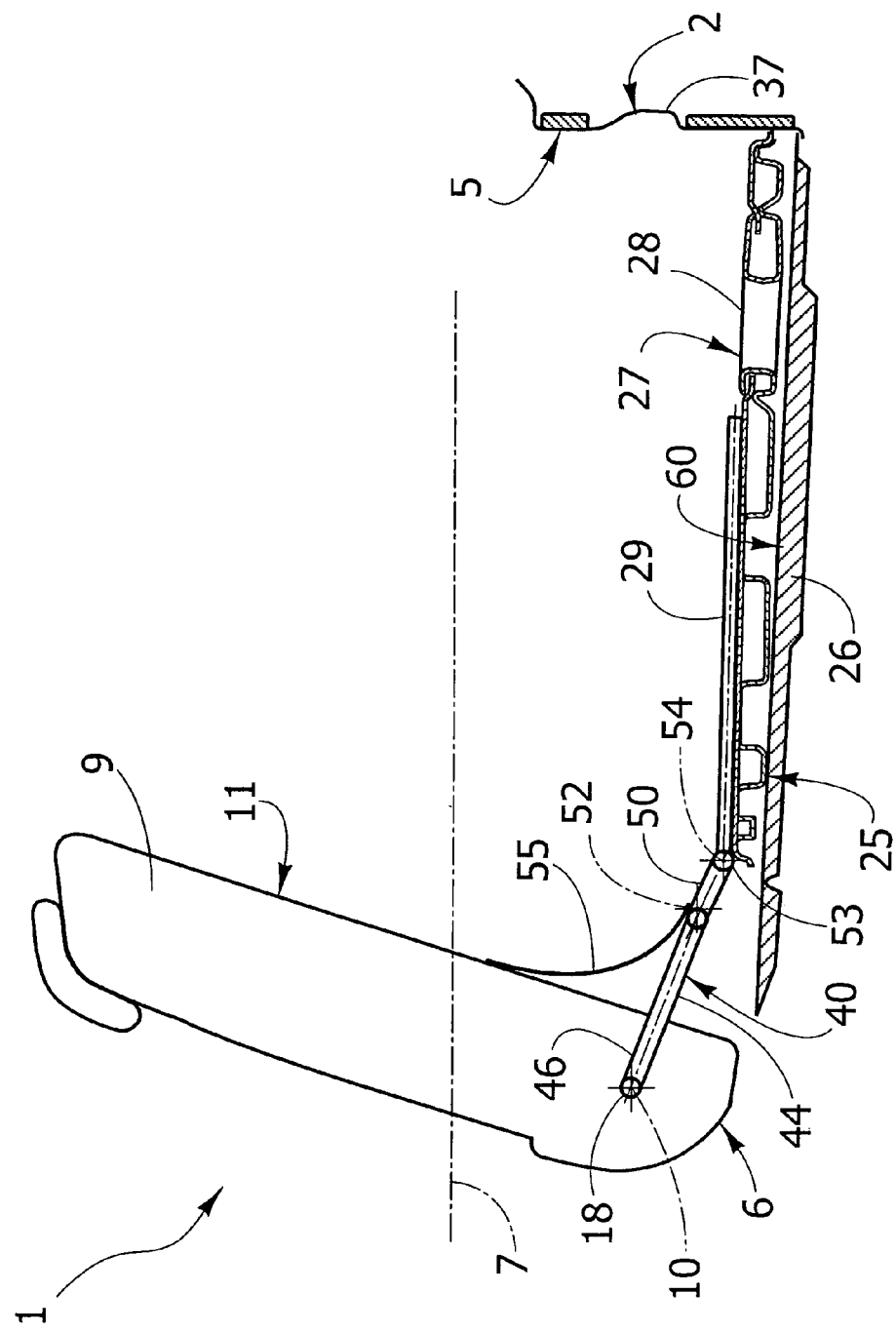
FIG. 2 is a schematic side view of the seat assembly in FIG. 1, and FIGS. 3 to 5 are similar to FIG. 2 and show the seat assembly arranged in different functional configurations.
Figure 3:
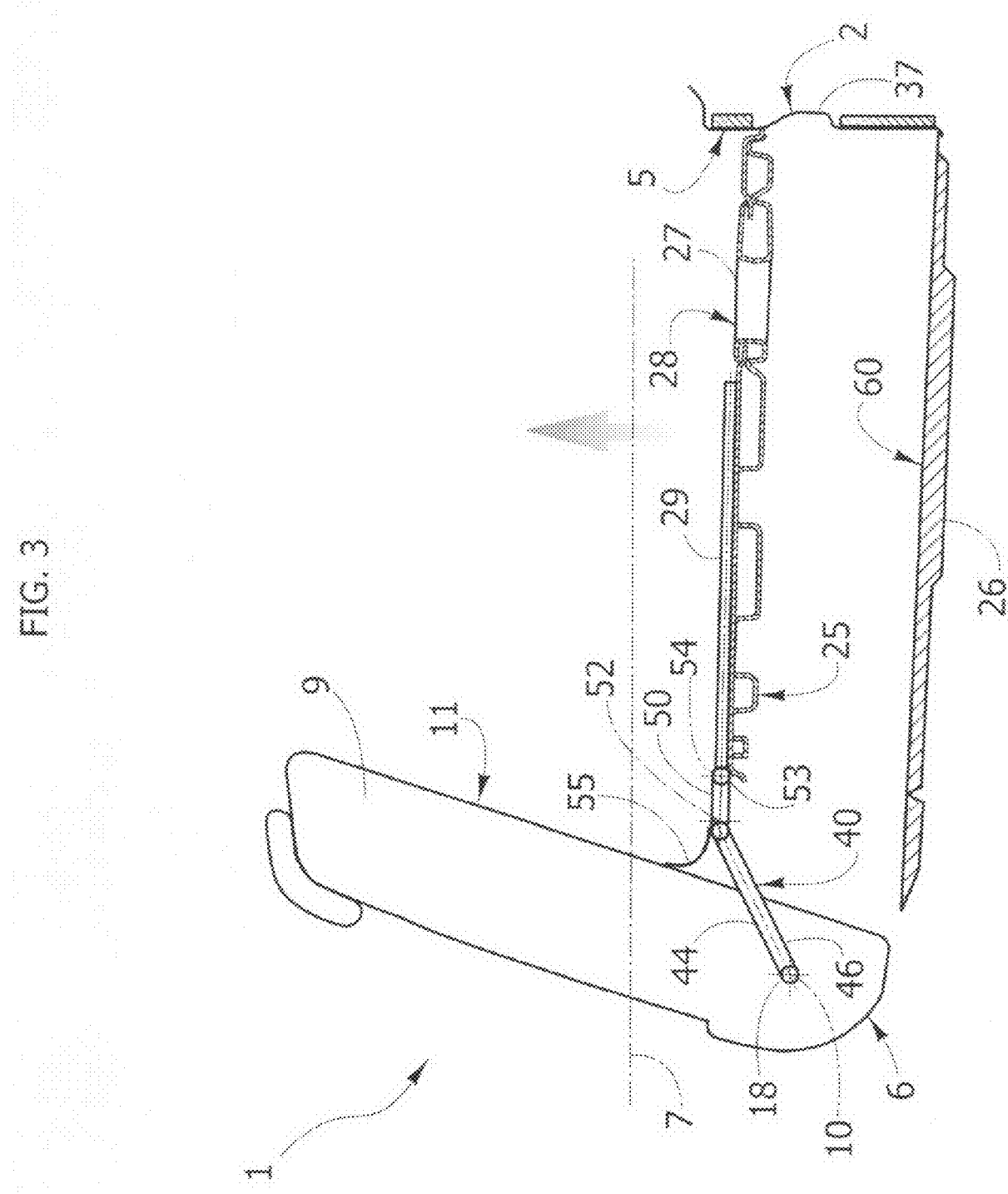
Figure 4:
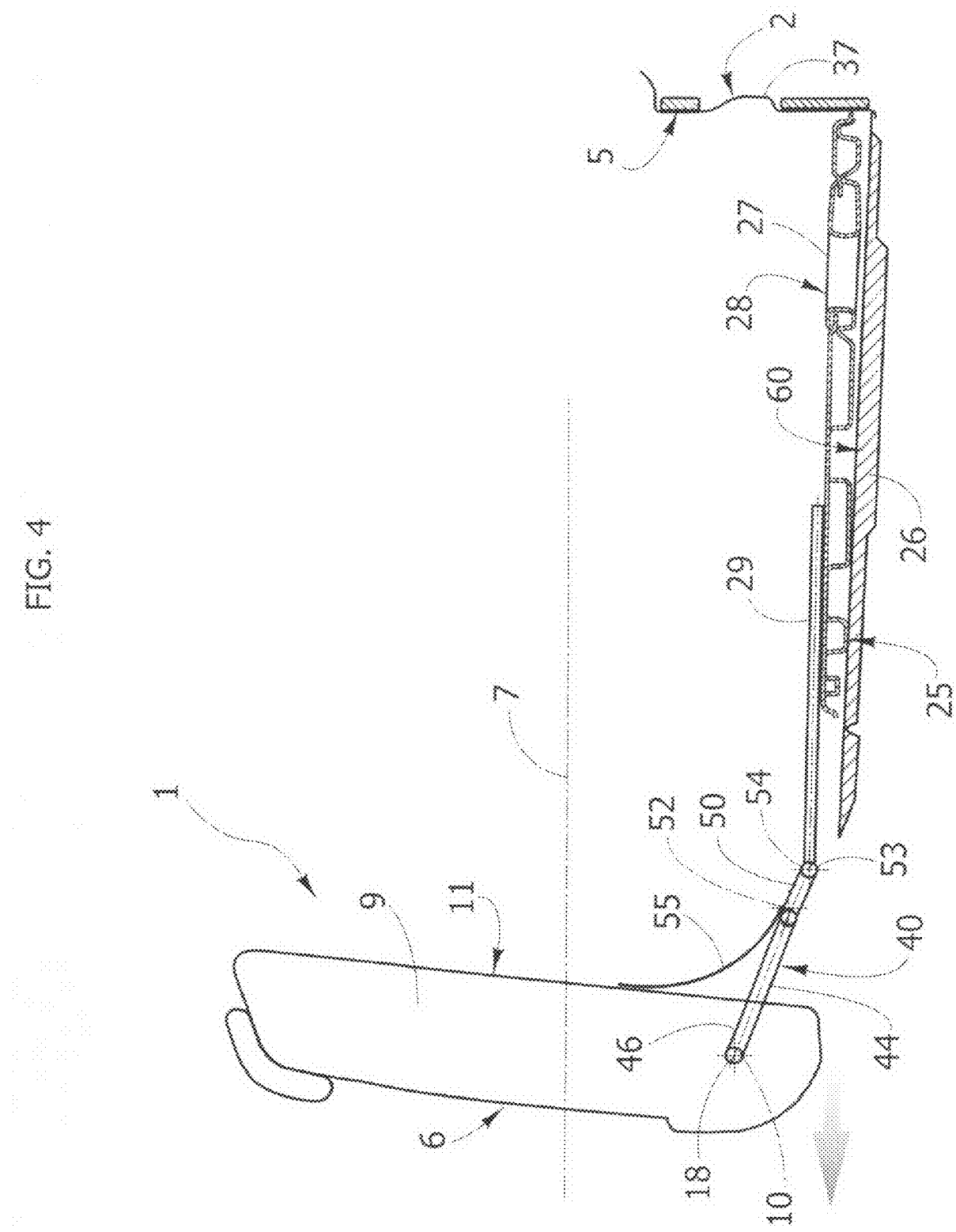
Figure 5:
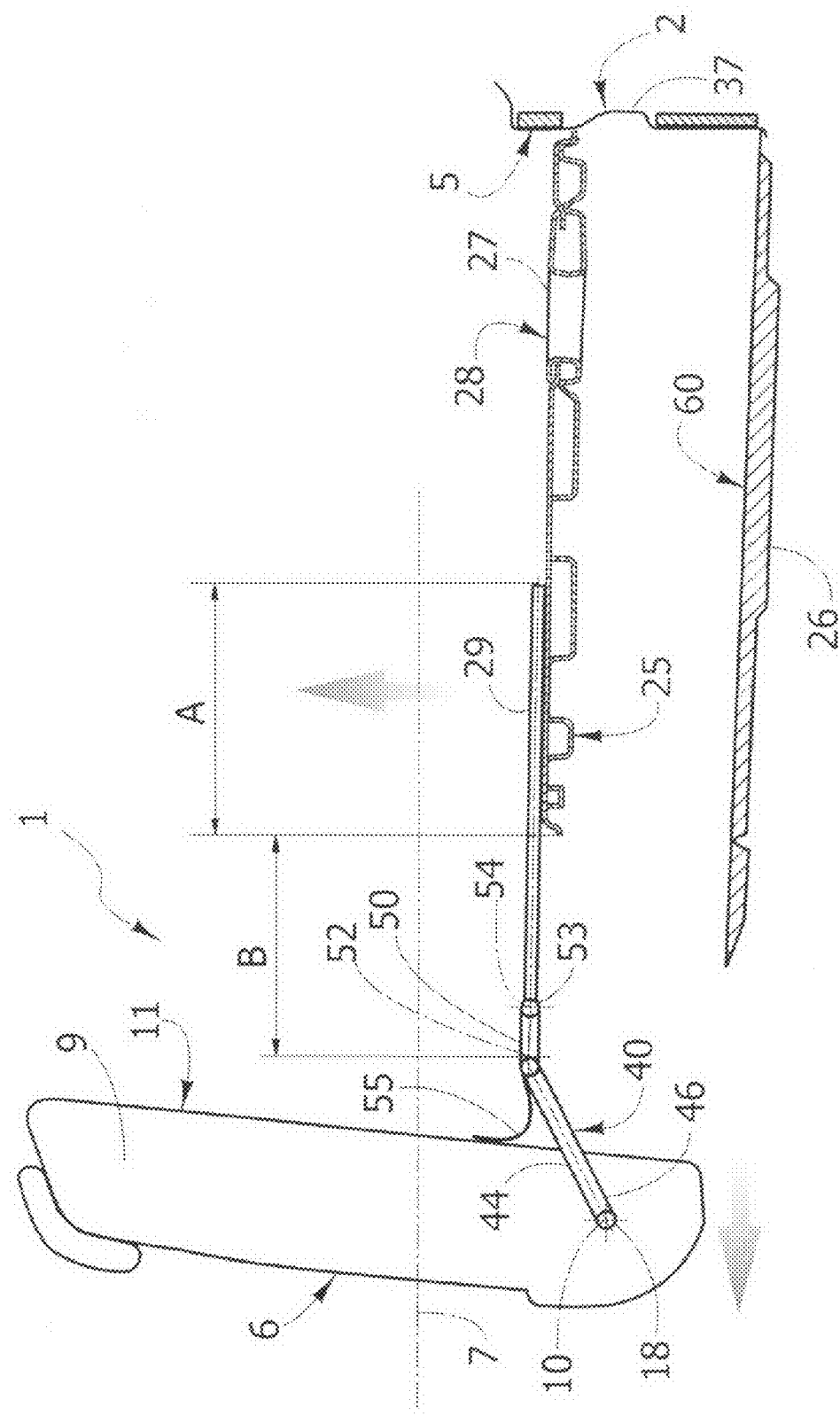

In FIG. 1, reference numeral 1 indicates, in its entirety, a seat assembly (partially shown) placed in a motor vehicle 2 (partially shown) comprising a rear trunk 5 for luggage.

The seat assembly 1 comprises a rear seat 3, which is placed in the rear zone of the passenger compartment, so as to define the front of the trunk 5, and is of the split type, or rather comprises two seats 6 side by side in a horizontal direction orthogonal to the longitudinal direction of travel 7 of the motor vehicle. Preferably, the seats 6 have different widths.

Each seat 6 comprises an associated seat cushion or seat bottom 8 (partially shown) and an associated backrest 9, which can turn with respect to the seat bottom 8 about a horizontal axis 10 orthogonal to the direction of travel 7, both for adjusting the tilt of the backrest 9 for ergonomic purposes, and to be able to fold down the backrest 9 in the forward direction (in a way not shown) and, therefore, be able to add the rear zone of the passenger compartment to the boot 5. For each seat 6, the backrest 9 has a rear surface 11 that is substantially flat and that when the backrest 9 is folded down in the forward direction, is positioned horizontally and faces upwards.

Each seat 6 comprises an associated support structure, which is coupled to a positioning device (not shown) that allows the seat 6 to move with respect to the floor of the passenger compartment between a forward position and a rear position parallel to the direction of travel 7, to extend or reduce the longitudinal size of the boot 5, whilst leaving the number of seats for passengers in the passenger compartment unchanged. Preferably, the seats 6 are longitudinally movable in a mutually independent manner. The positioning device, for example, could comprise two longitudinal guides or a jointed quadrilateral for seat 6.

The enclosed figures only show one rod 18 of the support structure of each seat 6; this rod extends along axis 10 and comprises a portion 19 inside the backrest 9 and two opposite end portions 20 and 21, external to the backrest 9.

Portion 20 is coupled to a retaining and adjusting device 22, of known type and not described in detail, which can be operated by hand, by a lever 23 for example, to adjust the tilt of the backrest 9 about axis 10 and/or to fold down the backrest 9. In particular, the backrest 9 is folded down in the forward direction when the seats 6 are located in the rearward position and after having also tipped the corresponding seat bottom 8 forwards, placing it in contact against a front seat (not shown), so as to create a suitable space for the backrest 9 in place of the seat bottom 8. The device 22 is fixed to the backrest 9 in a manner that is not shown, such that the device 22 and the lever 23 turn together with the backrest 9 about axis 10.

The seat assembly 1 also comprises a load floor 25, which is movable between a raised position and a lowered position above a substantially horizontal floor 26 (FIGS. 2 to 5) that is fixed with respect to the body of the motor vehicle (unless there happens to be a hatch of a compartment for the spare wheel), and defines the bottom of the boot 5.

Still with reference to FIG. 1, the load floor 25 comprises a rear panel 27, which has a flat upper surface 28 and a width substantially equal to that of the boot 5, and two front panels 29, which are side by side in a direction parallel to axis 10, have the same length, have widths substantially equal to those of the respective seats 6, and are coupled in a longitudinally sliding manner to panel 27 to vary the length of the load floor 25 depending on the longitudinal position of the seat 6. Preferably, panels 29 at least partially overlap panel 27, and the lateral edges 30 of panels 29 engage in a sliding manner with respective longitudinal guide slots defined by two lateral elements 31 and an intermediate element 32, which are positioned on surface 28 and fixed to panel 27.

Panel 27 is coupled to the side walls 33 of the boot 5 via respective guides 34, which are fixed with respect to the walls 33 and are engaged in a sliding manner by respective lateral projections or pins 35 carried by panel 27, preferably by elements 31, to guide the load floor 25 and facilitate the manual movement between the raised and lowered positions.

Preferably, the rear wall 37 of the boot 5 comprises one or more support portions 38 for the rear end of panel 27, to support panel 27 in the raised and/or lowered position. Regarding the lowered position, support could be defined by the floor 26 in alternative to portions 38.

Preferably, the walls 33 and/or 37 of the boot 5 are fitted with a releasable locking system (not shown) to keep the load floor in the raised position and/or the lowered position. Preferably, this releasable locking system is mounted in the guides 34.

In addition to being constrained by the guides 34, the path of the load floor 25 during the upward and downward movement is also constrained by two lever members 40, one for each seat 6. The lever members 40 are hinged to the support structures of the seats 6 to turn about respective axes of rotation coincident with axes 10. In other words, the axes of rotation of the lever members 40 are in fixed positions with respect to the associated seats 6 during the longitudinal movement of the seats 6. As can be deduced from FIGS. 2 to 5, the members 40 swing upwards and/or downwards as a consequence of the movement of the load floor 25, which is performed manually by the user.

Each lever member 40 comprises an element 44, for example, a tube or moulded plastic part, which, in turn, comprises an intermediate cylindrical portion 45 and two squashed end portions 46. Portion 45 is positioned behind the seat 6, is straight and parallel to axis 10; portions 46, instead, are positioned on opposite sides of the backrest 9, are radial with respect to axis 10, are connected to portion 45 and are fixed to respective bushings 47 and 48.

The bushings 47 and 48 are fitted on portions 20 and 21 respectively and are free to turn with respect to the rod 18 and the seat 6. Bush 47 is placed in an intermediate position between the backrest 9 and the device 22.

Portions 45 of the lever members 40 are coupled to panels 29 by inserting respective articulated elements, in particular, defined by panels 50 having a relatively small size in the longitudinal direction. The front ends of panels 50 are hinged to portions 45 about respective axes 52, which extend along the perimeter of the cylindrical portions 45; the rear ends of panels 50 are hinged to the front edges 53 of panels 29 about respective axes 54. Therefore, for each seat 6, axes 10, 52 and 54 are parallel and spaced apart from each other.

With reference to FIGS. 2 to 5, a flexible covering sheet 55 is placed between the load floor 25 and the backrests 9. For simplicity of representation, the sheet 55 is not shown in FIG. 1. The sheet 55 is defined by two distinct pieces, which are arranged side by side, are each associated with a corresponding seat 6, together cover the entire width of the boot 5 and are of sufficient length to cover the empty space between panels 50 and the backrests 9, independently of the height position of the load floor 25, independently of the tilt of the backrests 9 and independently of the longitudinal position of the seats 6. This length is such that the pieces of the sheet 55 are completely spread out when the seat assembly 1 is set in a configuration (not shown) in which the backrests 9 are folded down in the forward direction, the load floor 25 is in the lowered position and the seats 6 are longitudinally in the rearmost position.

The opposite longitudinal ends of each piece of sheet 55 are respectively fixed, in a manner not described in detail, to the edge 53 of the associated panel 29 and the surface 11 of the associated seat 6. Alternatively, the rear ends of the pieces of sheet 55 are fixed to panels 50.

With reference to FIG. 1, the load floor 25 can be moved by hand between the raised and lowered positions by acting on a rear grip portion 57 made on 27. Panel 27 can freely turn about an axis 58, which is parallel to axis 10, is defined by pins 35 and is movable along a fixed path defined by the guides 34. While panel 27 is raised or lowered along the guides 34, panels 29 also turn about axis 58. The movement of the front edges 53 of panels 29 drags the lever members 40 into rotation, via the interposition of panels 50.

During the raising or lowering of the load floor 25 and, hence, the rotation of the lever members 40, panels 29 slide with respect to panel 27 along elements 31,32: in this way, the differences between the circular path of portions 45 about axes 10 and the circular path of edges 53 about axis 58 are compensated. Moreover, the articulation defined by panels 50 helps to compensate for the difference between these paths and also to compensate for any play and positioning errors of the seat assembly 1.

When in the raised position (FIGS. 3 and 5), the load floor 25 defines a trapdoor for an underlying space or under floor area 60, which is hidden from view from outside of the motor vehicle precisely thanks to the load floor 25. In this configuration, the load floor 25 can be raised by the grip portion 57, thereby making the load floor 25 turn about axis 58 (in the anticlockwise direction with respect to the side view in FIGS. 3 to 5), to open the under floor area 60 and stow luggage or other objects beneath the load floor 25.

When the seats 6 are moved longitudinally (FIGS. 4 and 5), the rods 18 longitudinally pull or push panels 29. At the same time, panel 27 remains stationary in the longitudinal direction, in particular because the pins 35 are longitudinally locked by the guides 34. In consequence, panels 29 slide in the guide slots of elements 31,32, and the length of the load floor 25 automatically varies according to the longitudinal movement of the seats 6.

From the foregoing, it is evident how the load floor 25 can be easily configured to adapt to both the longitudinal position chosen for the seats 6, and to the height position chosen for the load floor 25. In particular, when the load floor 25 is in the raised position, the length of the upper surface available on the load floor 25 for stowing things increases when the seats 6 are moved forwards. Preferably, for in load-supporting resistance requirements, when the seats 6 are located in a forward end-stop position (FIG. 5), the distance B between the front edge of panel 27 and axis 52, or rather the length of the part of the surface that overhangs with respect to panel 27, is less than or equal to the distance A between the rear edge of panel 29 and the front edge of panel 27, or rather the length of the part of the surface that remains coupled to panel 27.

It is also evident how the sheets 55 avoid objects accidentally falling into the empty space between the seats 6 and the load floor 25, especially when the load floor 25 is in the raised position.

From the above described functioning, it is also shown that the characteristics of the assembly 1 allow the height of the load floor 25 to be changed by using just one hand to grasp the grip portion 57.

In particular, panels 50 could be absent, with the lever members 40 hinged directly on panels 29; and/or the lever members 40 could have a different shape.

Portions 38 could be absent, if the guides 34 were sufficient to support the load floor 25.

Finally, the tilt of the backrests 9 could be fixed, or rather device 22 could be absent; and/or the lever members 40 could be hinged in a different position from the rods 18, namely to the backrests 9, to the seat squabs 8 or to other parts of the support structures; and/or the seat 3 might not be of the split type.

Lastly, panels 29 could be guided directly by panel 27 to longitudinally slide, for example, in a slot directly inside panel 27.

Finally, while the invention has been described in connection with what is presently considered to be the most practical and preferred non-limitative embodiment, it is clear that modifications and variants can be made to the seat assembly as described and shown herein and it is to be understood that the invention is not to be limited to the disclosed embodiment, but on the contrary, is intended to cover any such modifications and equivalent arrangements as may be included within the spirit and scope of the appended claims.

The invention claimed is:

1. A motor vehicle seat assembly comprising:
    a rear seat;
    a load floor that is height-adjustable and can be placed inside a trunk; and
    at least one lever member mounted to move about a first horizontal axis and coupled to a front portion of said load floor in a rotational manner about a second horizontal axis;
said first and second horizontal axes being set apart and parallel to each other, and being orthogonal to a longitudinal axis of the motor vehicle;
wherein said rear seat is longitudinally movable to vary the size of the trunk; said first horizontal axis being fixed with respect to said rear seat during the longitudinal movement of said rear seat; and said load floor comprises a substantially flat rear panel coupled in a longitudinally sliding manner to said front portion to vary the length of said load floor depending on the longitudinal position of said rear seat.

2. The assembly according to claim 1, wherein said rear seat (6) comprises a backrest (9), which can turn about a hinge axis coincident with said first horizontal axis (10).

3. The assembly according to claim 2, wherein said rear seat (6) comprises:
    a support and hinge rod (18), which extends along said hinge axis (10) and comprises at least one external portion (20) with respect to said backrest (9);
    an adjustment device (22), which is coupled to said support and hinge rod (18) and can be operated to adjust the tilt of said backrest (9) about said hinge axis (10);
said at least one lever member (40) being hinged in a idle manner to said external portion (20).

4. The assembly according to claim 3, wherein said at least one lever member (40) comprises at least one bush (47) fitted in an idle manner to said external portion (20) and placed in an axially intermediate position between said adjustment device (22) and said backrest (9).

5. The assembly according to claim 1, wherein said at least one lever member (40) comprises:
    a straight, intermediate, cylindrical portion (45), parallel to said first horizontal axis (10) and coupled to said front portion (29,50), and
    two squashed portions placed on opposite sides of the rear seat (6).

6. The assembly according to claim 1, wherein said front portion (29,50) comprises a front panel (29) and an articulated element (50), the opposite longitudinal ends of which are respectively hinged to said at least one lever member (40) about said second horizontal axis (52), and to said front panel (29) about a third horizontal axis (54) parallel to said hinge axis (10).

7. The assembly according to claim 6, wherein said articulated element is defined by a further panel.

8. The assembly according to claim 1, further including two lateral guides (34) that can be fixed to respective side walls (33) of said boot (5) to guide the upward and downward movement of said rear panel (27).

9. The assembly according to claim 8, wherein said load floor (25) can turn about a fourth horizontal axis (58) parallel to said first horizontal axis (10) and movable along a path defined by said lateral guides (34).

10. The assembly according to claim 1, further including a flexible sheet (55), the opposite longitudinal ends of which are respectively coupled to said load floor (25) and to a rear surface (11) of said backrest (9), said flexible sheet (55) having sufficient length to longitudinally cover the empty space between said backrest (9) and said load floor (25) independently of the height position of said load floor (25) and independently of the longitudinal position of said rear seat (6).

11. The assembly according to claim 1, further including guide elements (31,32) fixed to said rear panel (29) and engaged by said front portion (29,50) in a longitudinally sliding manner.

12. The assembly according to claim 1, wherein said front portion (29,50) is longitudinally guided directly by said rear panel (29).

13. The assembly as in claim 1 wherein the rear seat comprises a split rear seat.

14. The assembly as in claim 13 wherein the split rear seat comprises two side-by-side seats having differing widths.

15. The assembly as in claim 14 wherein each of the two side-by-side seats includes a backrest that can turn about a hinge axis coincident with said first horizontal axis.

16. The assembly as in claim 15 wherein each of the two side-by-side seats comprises: a support and hinge rod, which extends along said hinge axis and comprises at least one external portion with respect to said backrest; an adjustment device, which is coupled to said support and hinge rod and can be operated to adjust the tilt of said backrest about said hinge axis; with at least one lever member operatively associated with each of the two side-by-side seats being hinged in a idle manner to said external portion.

17. The assembly as in claim 16 wherein each said at least one lever members comprises at least one bushing fitted in an idle manner to said external portion and placed in an axially intermediate position between said adjustment device and said backrest.

18. The assembly as in claim 14 wherein each of said at least one lever members comprises: a straight, intermediate, cylindrical portion, parallel to said first horizontal axis and coupled to said front portion, and two squashed portions placed on opposite sides of each of the two side-by-side seats.

* * * * *